(12) United States Patent
Rawas et al.

(10) Patent No.: US 11,872,689 B2
(45) Date of Patent: Jan. 16, 2024

(54) END EFFECTOR FEATURES FOR ADDITIVELY MANUFACTURED COMPONENTS

(71) Applicant: DIVERGENT TECHNOLOGIES, INC., Los Angeles, CA (US)

(72) Inventors: Oussama Rawas, Allen, TX (US); Roy Smith, Escondido, CA (US); Alex James Hamade, Redondo Beach, CA (US); Muhammad Faizan Zafar, Long Beach, CA (US); Keith Allen Fleming, Torrance, CA (US); Eahab Nagi El Naga, Topanga, CA (US); Antonio Bernerd Martinez, El Segundo, CA (US); Chukwubuikem Marcel Okoli, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 407 days.

(21) Appl. No.: 15/925,640

(22) Filed: Mar. 19, 2018

(65) Prior Publication Data
US 2019/0283260 A1 Sep. 19, 2019

(51) Int. Cl.
*B25J 15/00* (2006.01)
*B29C 64/153* (2017.01)
(Continued)

(52) U.S. Cl.
CPC .......... *B25J 15/0033* (2013.01); *B22F 10/28* (2021.01); *B29C 64/153* (2017.08); *B33Y 10/00* (2014.12);
(Continued)

(58) Field of Classification Search
CPC .... B25J 15/0033; B29C 64/153; B33Y 30/00; B33Y 80/00; Y10S 901/30
See application file for complete search history.

(56) References Cited

U.S. PATENT DOCUMENTS

| 5,203,226 A | 4/1993 | Hongou et al. |
| 5,742,385 A | 4/1998 | Champa |

(Continued)

FOREIGN PATENT DOCUMENTS

| DE | 102017120923 A1 | 3/2019 |
| WO | 1996036455 A1 | 11/1996 |

(Continued)

OTHER PUBLICATIONS

US 9,202,136 B2, 12/2015, Schmidt et al. (withdrawn)
(Continued)

*Primary Examiner* — Zachary M Davis
(74) *Attorney, Agent, or Firm* — ARENTFOX SCHIFF LLP

(57) ABSTRACT

One aspect is an apparatus including an additively manufactured component including a surface with an end effector feature, the end effector feature co-additively manufactured with the additively manufactured component and configured to be gripped by a corresponding end effector on a robot. In an aspect, the end effector feature includes a recess in the surface. In another aspect, the recess includes an angled face. In an aspect, the recess has a teardrop shape. An aspect further includes an identification feature. In an aspect, the end effector feature includes a plurality of recesses in the surface. In another aspect, the end effector feature enables a 3-point kinematic self-aligning positive control lock.

30 Claims, 21 Drawing Sheets

(51) Int. Cl.
  *B33Y 30/00*  (2015.01)
  *B33Y 80/00*  (2015.01)
  *B33Y 10/00*  (2015.01)
  *B22F 10/28*  (2021.01)
  *B22F 12/44*  (2021.01)

(52) U.S. Cl.
  CPC .............. *B33Y 30/00* (2014.12); *B33Y 80/00* (2014.12); *B22F 12/44* (2021.01); *Y10S 901/30* (2013.01)

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,366,830 B2 | 4/2002 | Bacchi et al. |
| 6,391,251 B1 | 5/2002 | Keicher et al. |
| 6,398,279 B1 | 6/2002 | Kikut |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Yons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |

(56) References Cited

U.S. PATENT DOCUMENTS

| | | |
|---|---|---|
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |

(56) References Cited

U.S. PATENT DOCUMENTS

| | | |
|---|---|---|
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2013/0015596 A1 | 1/2013 | Mozeika et al. |
| 2014/0277669 A1 | 9/2014 | Nardi et al. |
| 2014/0358275 A1 | 12/2014 | Browne et al. |
| 2017/0057099 A1 | 3/2017 | Schweigert et al. |
| 2017/0113344 A1 | 4/2017 | Schönberg |
| 2017/0120387 A1 | 5/2017 | DeMuth et al. |
| 2017/0165751 A1* | 6/2017 | Buller .................. B29C 64/357 |
| 2017/0341309 A1 | 11/2017 | Piepenbrock et al. |
| 2017/0368759 A1* | 12/2017 | Penny .................. B33Y 40/00 |
| 2019/0021805 A1* | 1/2019 | Roeder .................. A61B 34/37 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015155300 A1 | 10/2015 |
| WO | 2015193331 A1 | 12/2015 |
| WO | 2016116414 A1 | 7/2016 |
| WO | 2017036461 A1 | 3/2017 |
| WO | 2017120028 A1 | 7/2017 |
| WO | 2017157851 A1 | 9/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Jorge Corona-Gastuera et al,; "An Approach for Intelligent Fixtureless Assembly: Issues and Experiments;" A. Gelbukh, A. de Albornoz, and H. Terashima (Eds.): MICAI 2005, LNAI 3789, pp. 1052-1061, 2005. © Springer-Verlag Berlin Heidelberg 2005.
Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.
Ogun, P. et al., 2015. "3D Vision Assisted Flexible Robotic Assembly of Machine Components." IN: Proceedings of 2015 8th International Conference on Machine Vision (ICMV 2015), Barcelona, spain, Nov. 19-21, 2015 (Proceedings of SPIE, 9878, DOI: 10.1117/12.2229053).
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.
International Search Report and Written Opinion dated Jun. 6, 2019, regarding PCT/US2019/022467.
The Extended Supplementary European Search Report issued for corresponding application No. EP 19772255.6, dated Dec. 13, 2021, 8 pages.

* cited by examiner

END EFFECTOR FEATURES FOR ADDITIVELY MANUFACTURED COMPONENTS

BACKGROUND

Field

The present disclosure relates generally to apparatus and techniques in manufacturing, and more specifically to end effector features for three-dimensional (3-D) printed components.

Background

3-D printing, which may also be referred to as additive manufacturing, is a process used to create 3-D objects. The 3-D objects may be formed using layers of material based on digital model data of the object. A 3-D printer may form the layers of material using the digital model data to print one layer at a time. 3-D printed objects may be almost any shape or geometry.

A 3-D printer may disseminate a powder layer (e.g., powdered metal) on an operating surface. The powder layer may be approximately 100 microns thick. The 3-D printer may then bond particular areas of the powder layer into a layer of the object, e.g., by using a laser to bond the powder of the powder layer together. The steps may be repeated form each layer sequentially. Accordingly, the 3-D printed object may be built layer by layer to form the 3-D object.

3-D printed components may be used to produce sub-components for various devices or apparatus. The 3-D printed sub-components may need to be attached or connected to other sub-components, including other 3-D printed sub-components, extruded sub-components, or still other sub-components. The 3-D printed components may be picked up and moved by robots and, accordingly, the 3-D printed components may include an end effector feature that allows an end effector of a robot to pick up and move the 3-D printed component.

SUMMARY

Several aspects of end effector features for 3-D printed components will be described more fully hereinafter with reference to three-dimensional printing techniques.

One aspect is an apparatus including an additively manufactured component. The additively manufactured component includes a surface with an end effector feature. The end effector feature may be configured to be gripped by a corresponding end effector on a robot. In an aspect, the end effector feature includes a recess in the surface. In another aspect, the recess includes an angled face. In another aspect, an angle of the angled face is between 89.9 and 0.1 degrees. In an aspect, the recess has a teardrop shape. An aspect further includes an identification feature. In an aspect, the end effector feature comprises a plurality of recesses in the surface.

BRIEF DESCRIPTION OF THE DRAWINGS

Various aspects of end effector features for 3-D printed components will now be presented in the detailed description by way of example, and not by way of limitation, in the accompanying drawings, wherein.

DETAILED DESCRIPTION

Figure 1A:
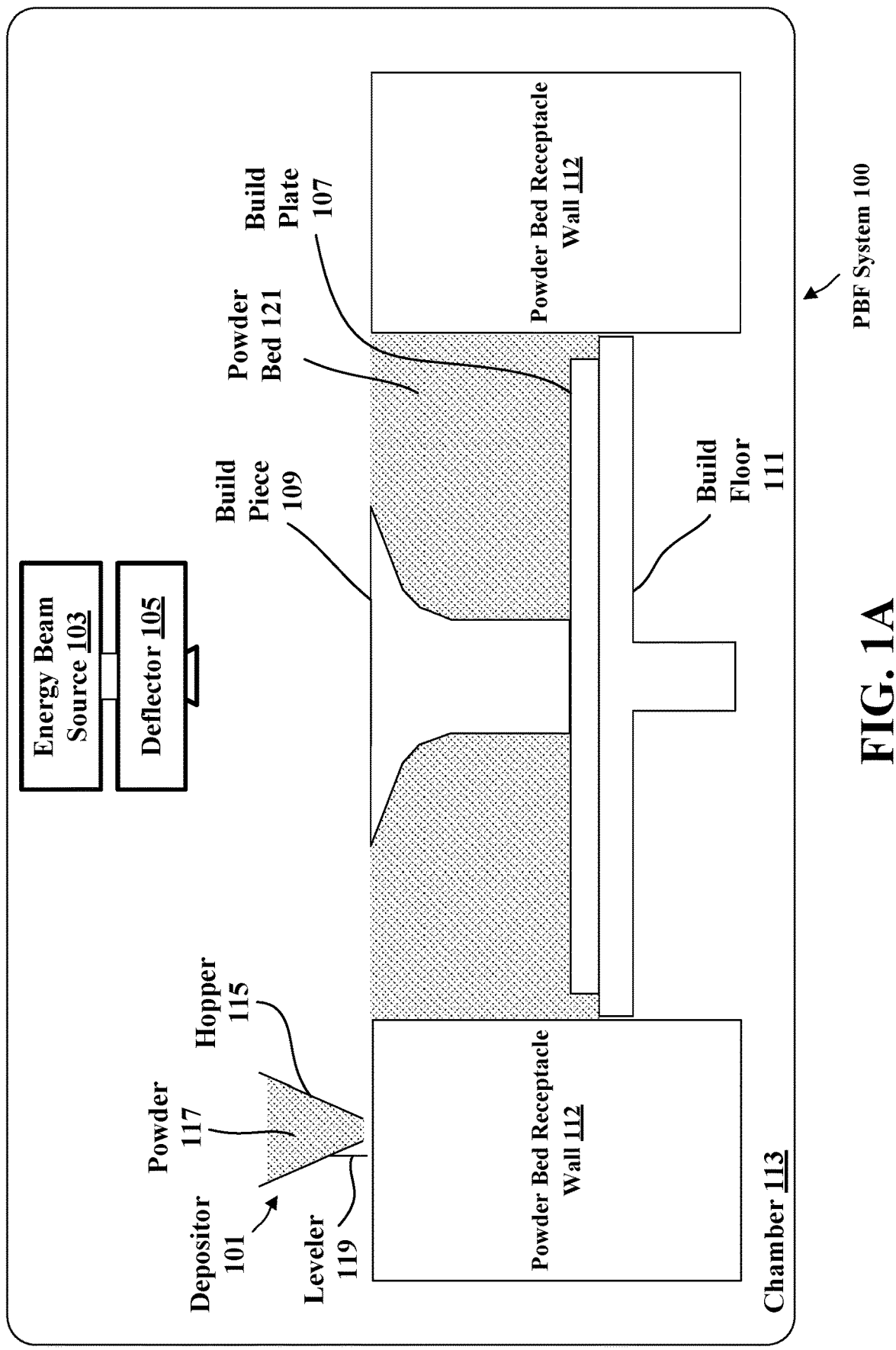
FIGS. 1A-D illustrate an example 3-D printer system during different stages of operation.

The detailed description set forth below in connection with the appended drawings is intended to provide a description of various exemplary embodiments of end effector features for additively manufactured components and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing in the context of composite tooling provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular aspect illustrated in FIGS. 1A-D is one of many suitable examples of a PBF system employing principles of this disclosure. It should also be noted that elements of FIGS. 1A-D and the other figures in this disclosure are not necessarily drawn to scale but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle (i.e., powder bed receptacle walls 112) generally define the boundaries of the powder bed receptacle, which is sandwiched between the power bed receptacle walls 112 from the side and abuts a portion of the build floor 111 below. Build floor 111 may progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
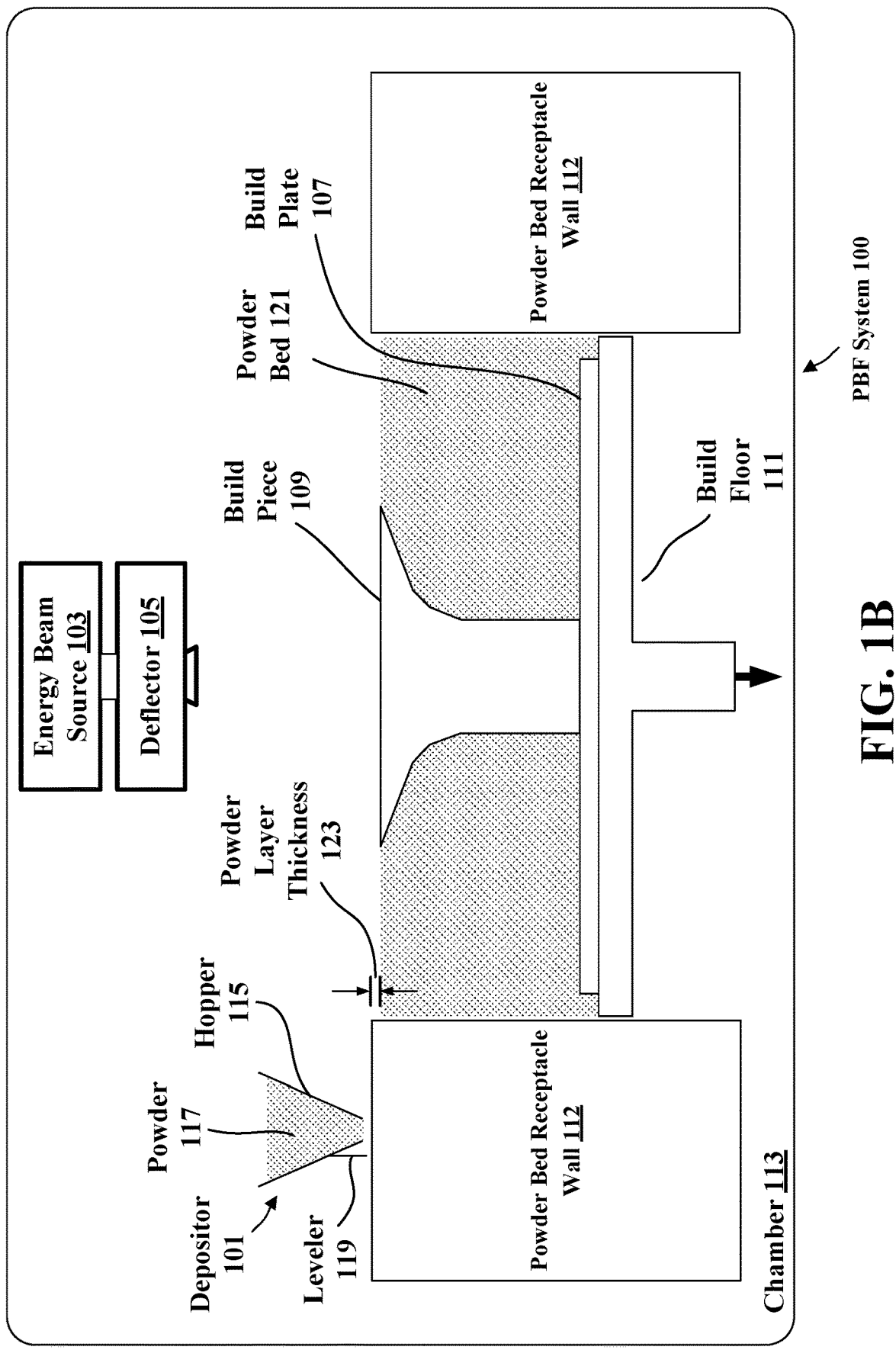

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
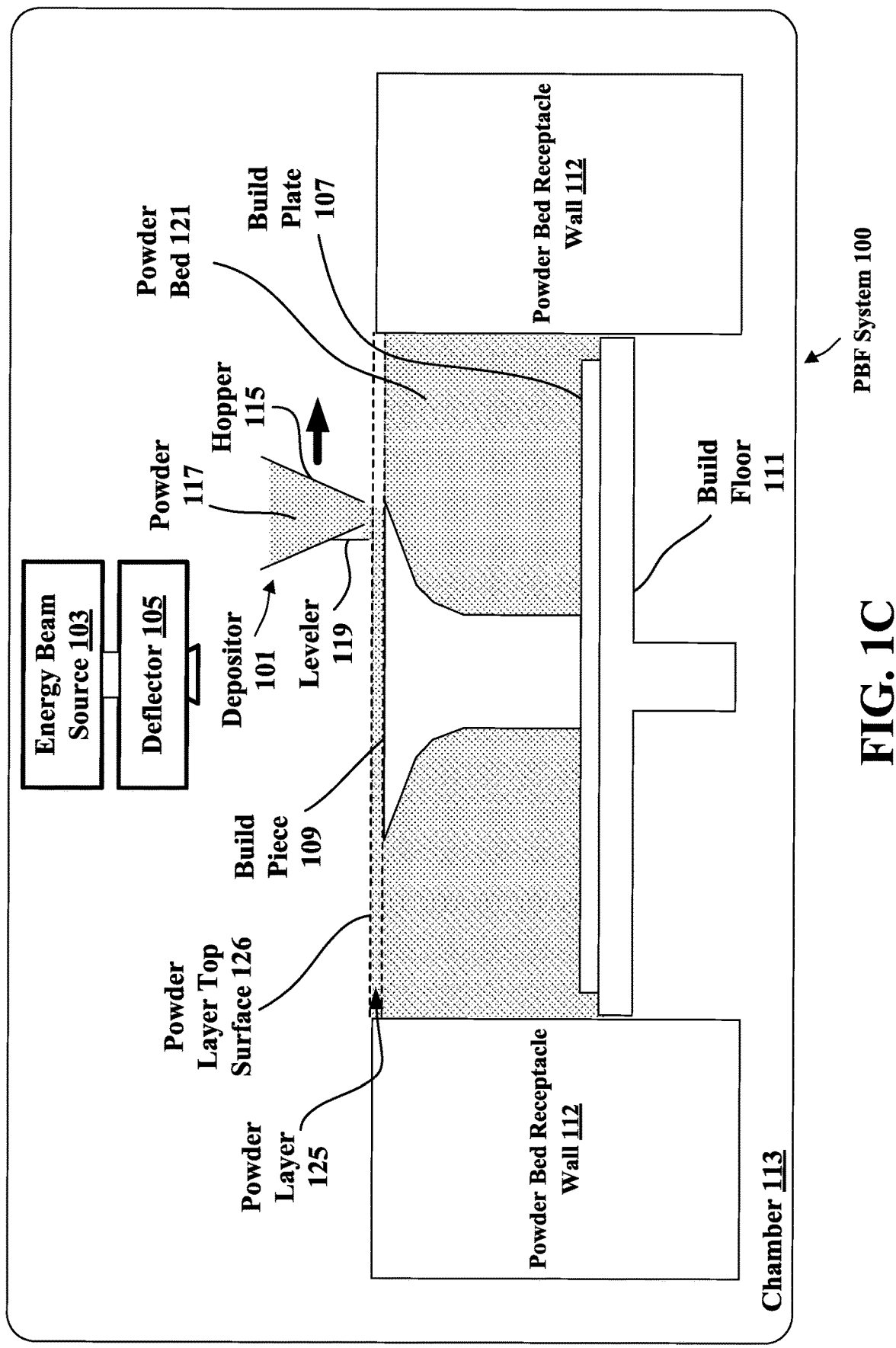

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, power bed receptacle walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
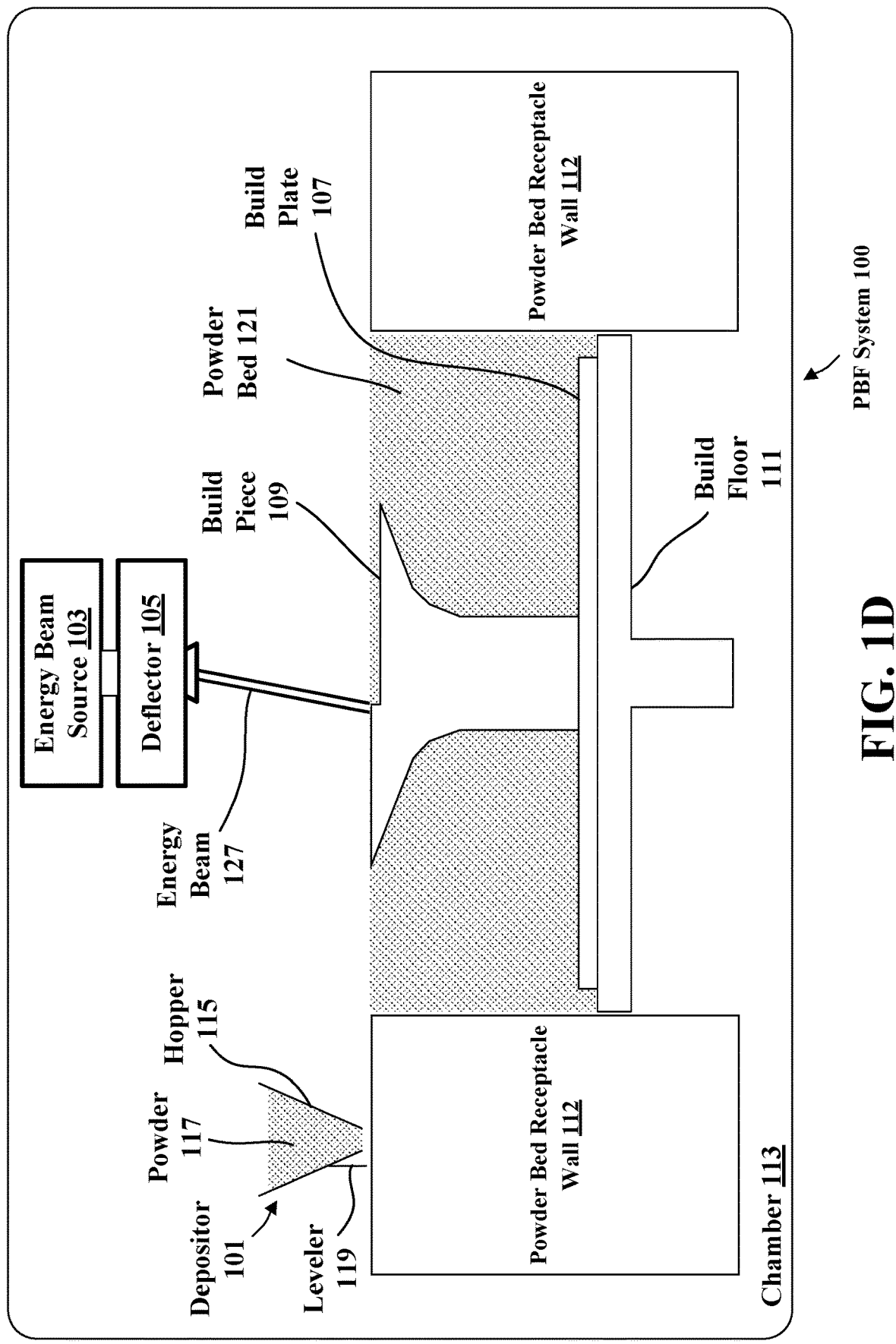

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary aspects, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various aspects, energy beam source 103 can be a laser, in which case energy beam 127 is a laser beam. Deflector 105 can include an optical system that uses reflection and/or refraction to manipulate the laser beam to scan selected areas to be fused.

In various aspects, the deflector 105 can include one or more gimbals and actuators that can rotate and/or translate the energy beam source to position the energy beam. In various aspects, energy beam source 103 and/or deflector 105 can modulate the energy beam, e.g., turn the energy beam on and off as the deflector scans so that the energy beam is applied only in the appropriate areas of the powder layer. For example, in various aspects, the energy beam can be modulated by a digital signal processor (DSP).

In an aspect, the PBF system 100 of FIGS. 1A-1D may provide means for additively manufacturing a component including a surface and means for co-additively manufacturing an end effector feature with the additively manufactured component, wherein the surface including the end effector feature and the end effector feature is configured to be gripped by a corresponding end effector on a robot. The PBF system 100 may further provide means for additively manufacturing an identification feature.

In robotics, an end effector may be a device at the end of a robotic arm, designed to interact with the environment. The end effector may be designed to grip an end effector feature, and the end effector feature may be designed to be gripped by the end effector. The systems and methods described herein relate to various example end effector features.

There are numerous forces acting on a component or part that is being lifted by a robotic arm. For example, friction may exist between the end effector features and the end effector of the robot arm. The coupling between the end effector features and the end effector of the robot arm may be configured to lift not only the weight of a component or part but also to continue to hold the component despite any acceleration due to the motion due to a robot having the end effector moving the object. The systems and methods described herein may lift the component or part not just using friction, but also by supplying some amount of list due to the end effector hooking or being beneath a portion of the end effector feature.

Figure 2:
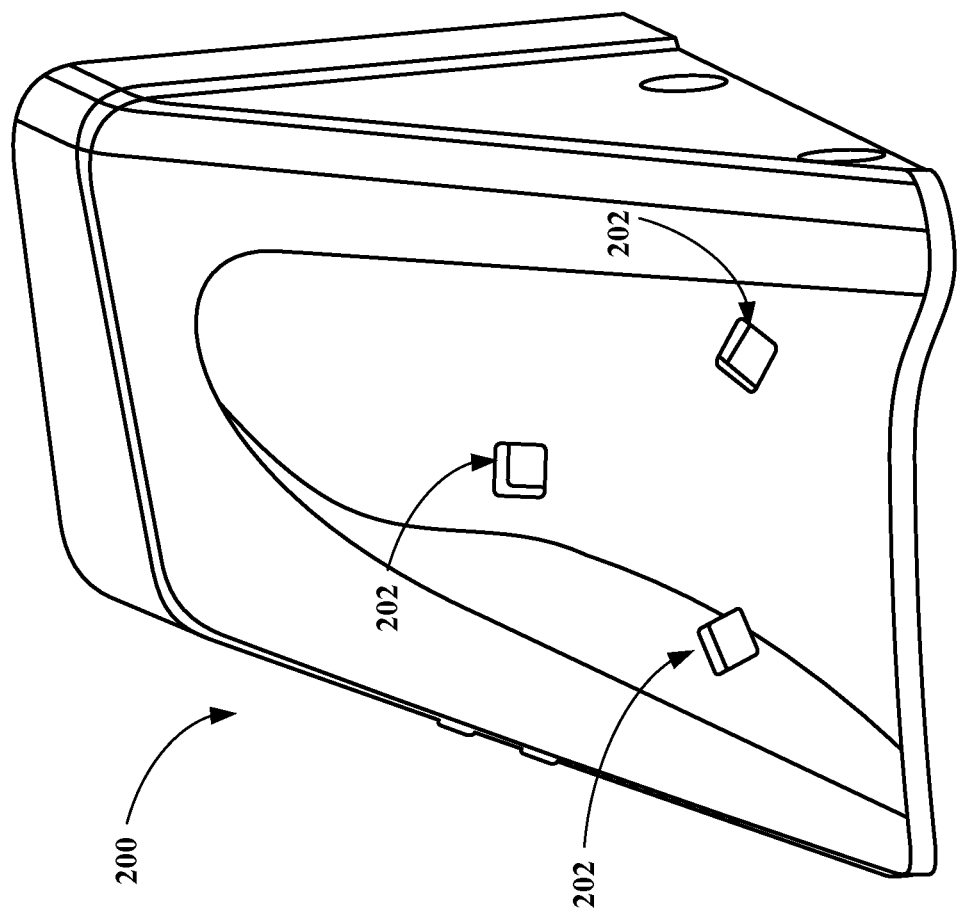
FIG. 2 is a diagram illustrating an example component that may be utilized in an automated assembly process of structures incorporating such components.

FIG. 2 is a diagram illustrating an example component 200 that may be utilized in an automated assembly process of structures incorporating such components 200. In an aspect, features (e.g., end effector features 202) on additively manufactured components 200 may be utilized in an automated assembly process of structures incorporating such components 200. The end effector features 202 would serve as an interface for an end effector on a robot to allow for the robot encountering the part and allowing the robot to grip the component 200, e.g., during an assembly process.

End effectors on robots may be attached to an end of an arm of the robot. The end effector may allow the robot to perform certain functions such as picking up the component 200. The following section presents various aspects of the end effector features and their corresponding effectors for the assembly process.

Figure 3:
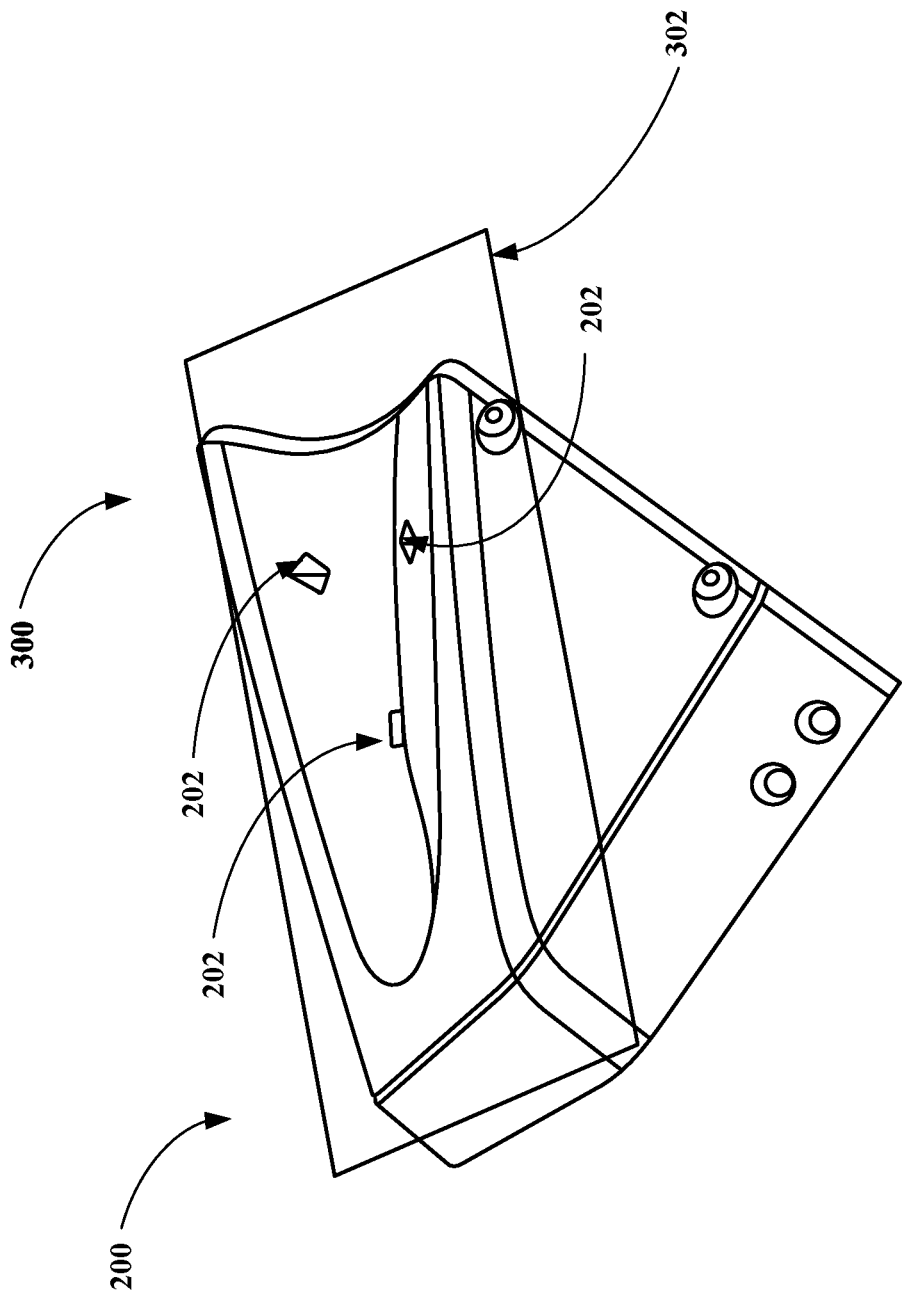
FIG. 3 is a diagram illustrating an aspect of the example component 200 of FIG. 2.

In an aspect, features on additively manufactured nodes would serve as locators for the end effectors to meet the node and pick it up. These features, or recesses, would be on the additively manufactured node. FIG. 2 illustrates an additively manufactured node with the end effector features:

FIG. 3 is a diagram illustrating an aspect of the example component 200 of FIG. 2. In an aspect, a bottom surface of the recesses (e.g., end effector features 202) may be co-planar, i.e., lay on the same plane 302. FIG. 3 depicts a reference plane 302 passing through the bottom surfaces of the end effector features 202.

Figure 4:
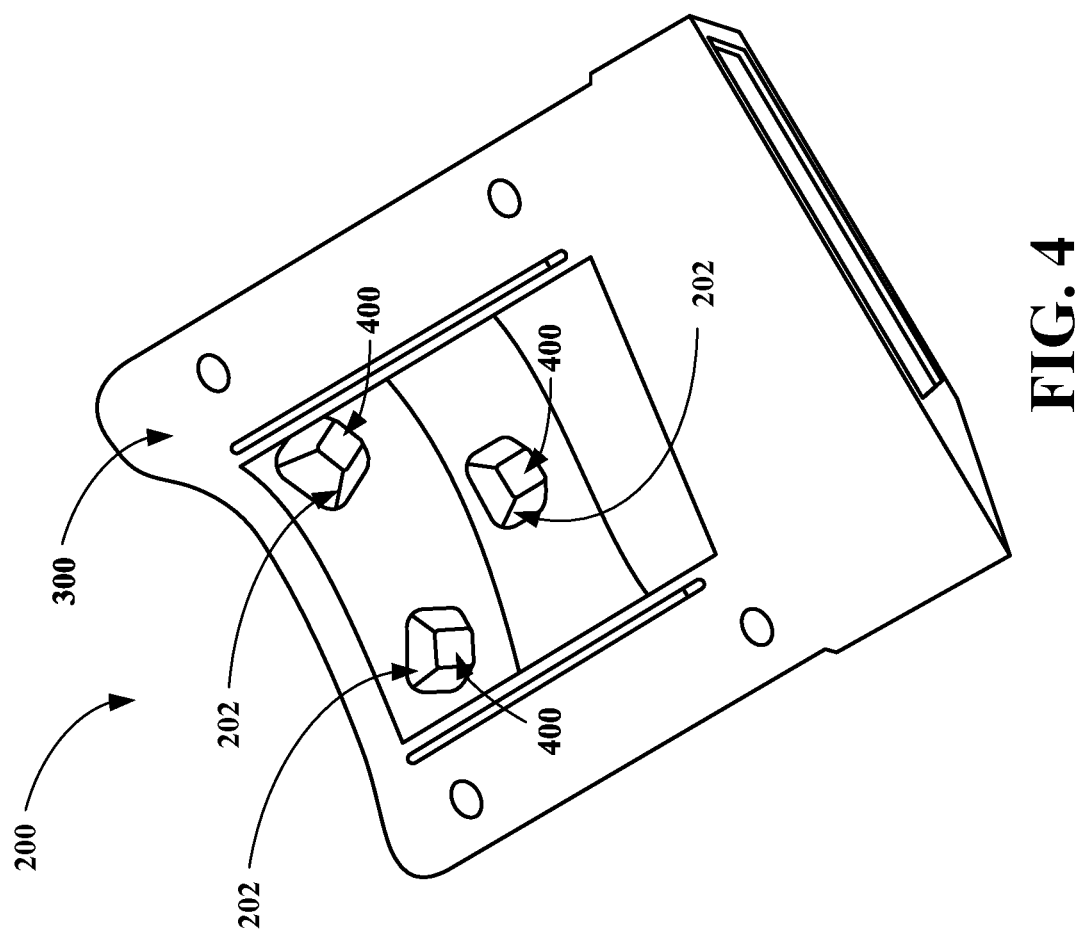
FIG. 4 is another diagram illustrating an aspect of the example component of FIGS. 2 and 3.

FIG. 4 is another diagram illustrating an aspect of the example component 200 of FIGS. 2 and 3. In an aspect, the bottom surface 400 of the recesses (e.g., end effector features 202) may be co-planar, i.e., lay on the same plane 302. FIG. 3 depicts a reference plane 302 passing through the bottom surfaces 400 of the end effector features 202. The co-planar nature of the bottom surfaces 400 of the end effector features 202, which may lie on the reference plane 302 is illustrated in FIG. 3.

Figure 5:
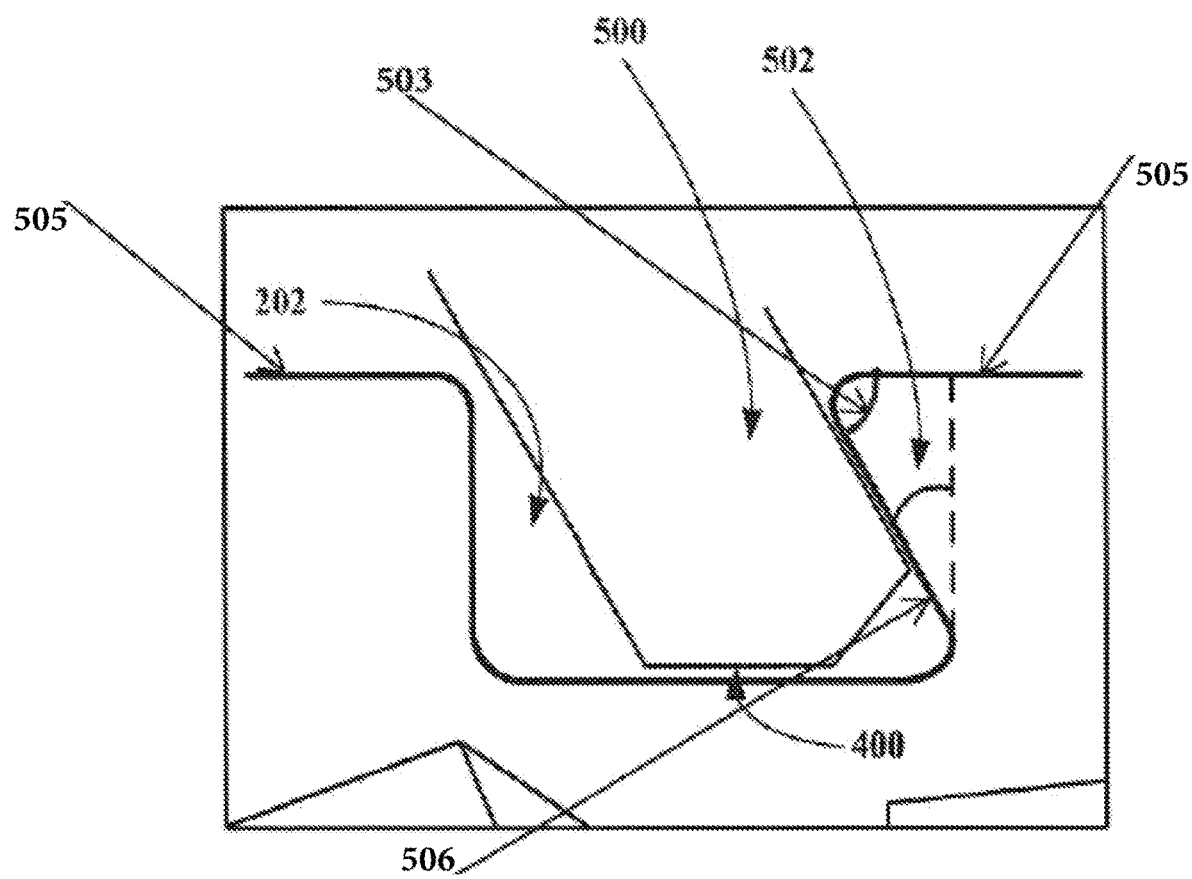
FIG. 5 is a diagram illustrating a prong of, for example, a three-pronged end effector in an end effector feature having a bottom surface.

FIG. 5 is a diagram illustrating a prong 500 of, for example, a three-pronged end effector in an end effector feature 202 having a bottom surface 400. In an aspect, the number of end effector features 202 on a node, e.g., component 200 that includes surface 505, may be three. The three end effector features 202 may correspond to a three-pronged end effector (not shown). The effector may be positioned to grab the part, e.g., the component 200 by holding on to the part through the effector features 202 and may pick the part, e.g., the component 200, up.

These features may be designed to account for certain design considerations. One design consideration may be to have at least one of the faces 506 angled 502 with respect to the base plane and angled 503 with respect to the surface 505. Having at least one of the faces angled 502 or 503 with respect to the base plane or surface may enable the gripper of the effector to grip the part, e.g., the component 200. When all the faces are perpendicular, the effector may not be able to engage with the feature to lift the part. In an aspect, the angle 502 of at least one face may be 10 degrees. In other aspects, the angle (i.e., 502 or 503) may be an angle from 89.9 to 0.1 degrees. It will be understood that other examples may not be angled, but rather, may be perpendicular. In such an example, a rough surface or other friction enhancement may be used to improve lifting ability.

Figure 6:
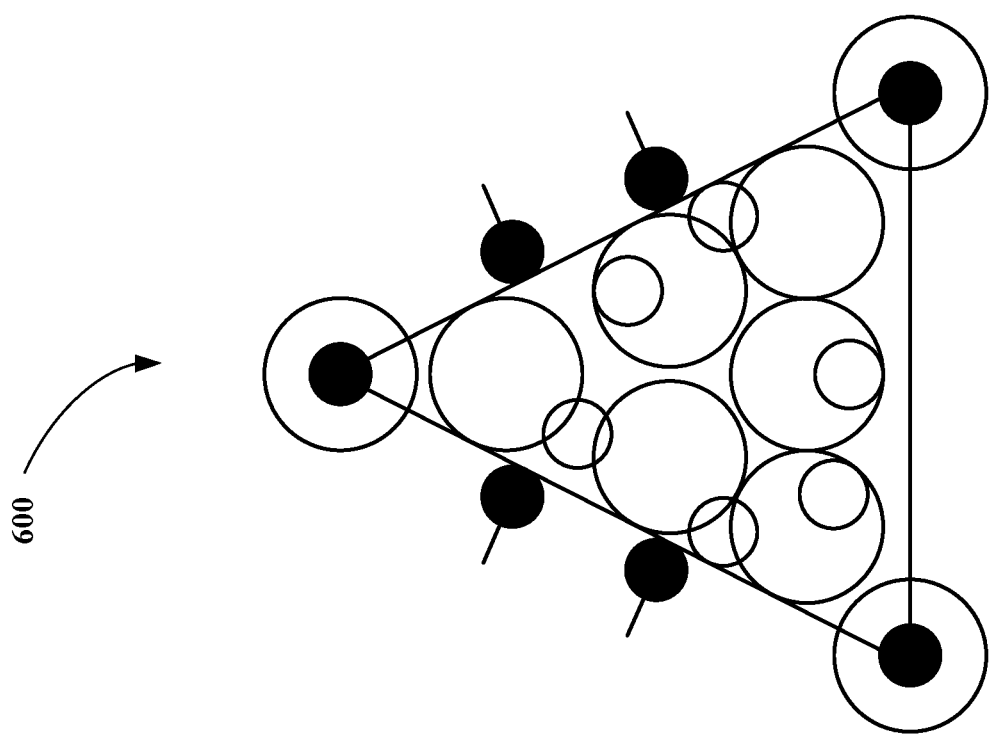
FIG. 6 is a diagram illustrating a minimum base surface area.

FIG. 6 is a diagram illustrating a minimum base surface area 600. In an aspect, another design consideration may be to use a minimum base surface area. A minimum base surface area requirement may be used for the features described herein. While the volume contained by an individual feature may be varied without departing from the scope, all features may be subject to a minimum surface area requirement. In an aspect, the surface area requirement may be dictated by a rectangle. For example, a rectangle dictating a surface area requirement for a feature may be a largest available rectangular portion on a component that may be available for the feature. An advantage of having a planar surface may be that having a planar surface may drive efficiency and stability in the gripping process, as opposed to a point contact. Additionally, planar or line contacts may provide better load distributions when the effector is in contact with the feature. In case of a point contact, the assembly process may potentially have a risk of denting the part or parts.

Corresponding effectors that may be fixed to the robot may either be additively manufactured, or fabricated through processes other than additive manufacturing.

Figure 7:
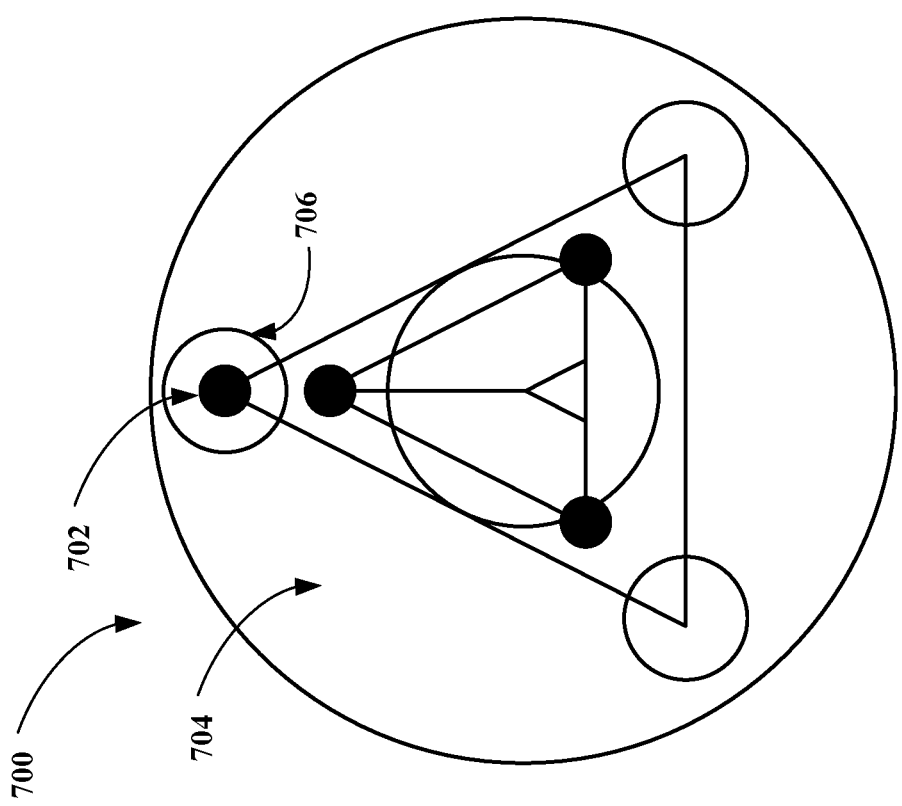
FIG. 7 is a diagram illustrating collets.

Features to accept end effectors with zero point fixturing may be additively manufactured with the component. The end effectors may work with the corresponding features on the part to locate, position, and grip the component. The following image depicts a feature to accept a zero-point fixturing end effector:

FIG. 7 is a diagram 700 illustrating collets 702. Collets 702 may be used on end effectors to grip a component for fixturing an assembly. The end effector may come into the end effector feature 704 on an additively manufactured component, after which a sleeve 706 of the collet 702 may expand. The sleeve 706 of the collet 702 expanding may thereby engage with the component, i.e., the end effector feature 704 of the component. Sides on the collet may expand radially into the collet feature, pushing against the corresponding features on the additively manufactured part to be attached.

Figure 8:
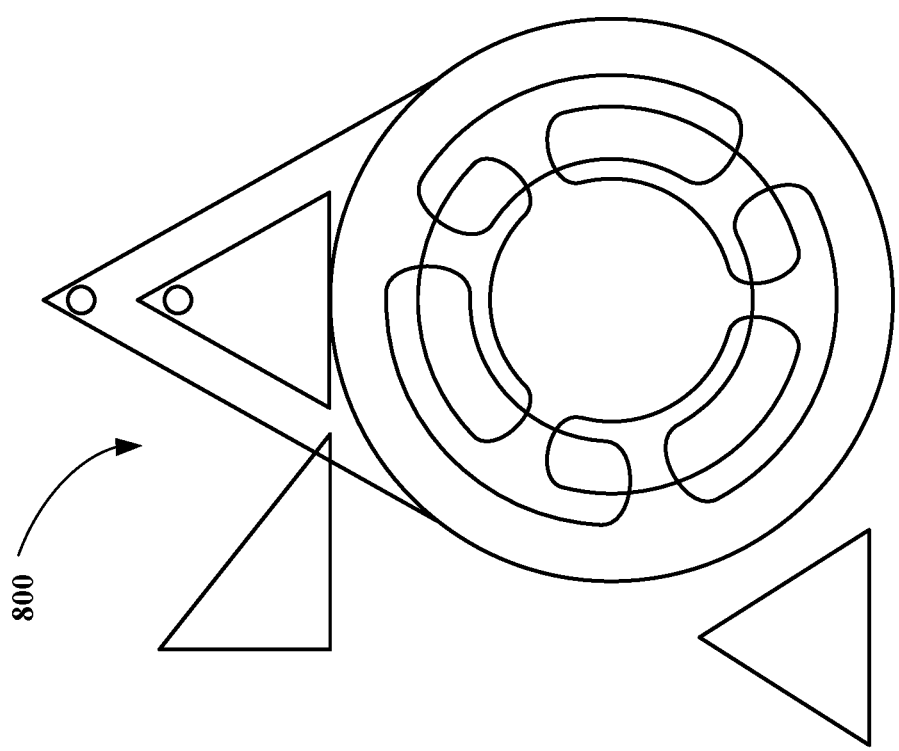
FIG. 8 is a diagram illustrating an end effector feature.

FIG. 8 is a diagram illustrating an end effector feature 800. The end effector feature 800 may resemble a teardrop. The end effector feature 800 resembling a teardrop may be additively manufactured with the additively manufactured component. In an aspect, using a larger recess with the feature may serve as a groove for the collet to engage with the part. In another aspect, using a smaller recess may enable a pin-type effector to engage with the part, thereby locking rotation of the part when it is being lifted.

Figure 9:
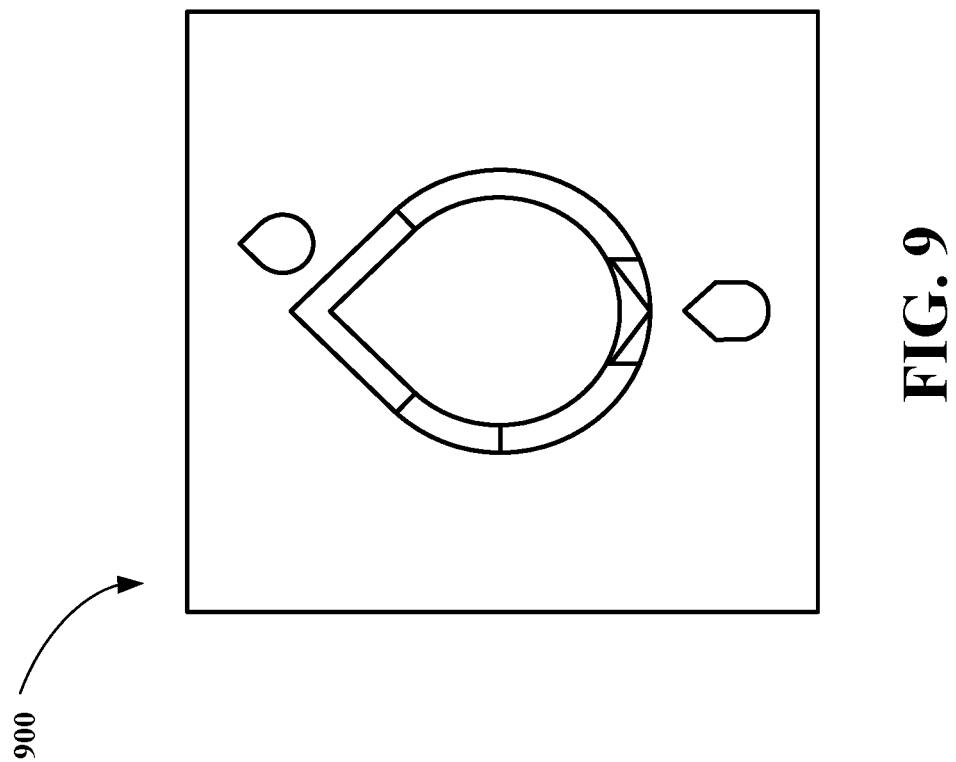
FIG. 9 is a diagram illustrating an end effector feature for an additively manufactured node that may be used in conjunction with an end effector.

FIG. 9 is a diagram illustrating an end effector feature 900 for an additively manufactured node that may be used in conjunction with an end effector. The end effector feature 900 may be a teardrop shape. For example, the end effector feature 900 may be configured to mate with or enable a 3-point kinematic self-aligning positive control locking end effector. The 3-point kinematic self-aligning positive control locking end effector may be used for additively manufactured nodes.

Figure 10:
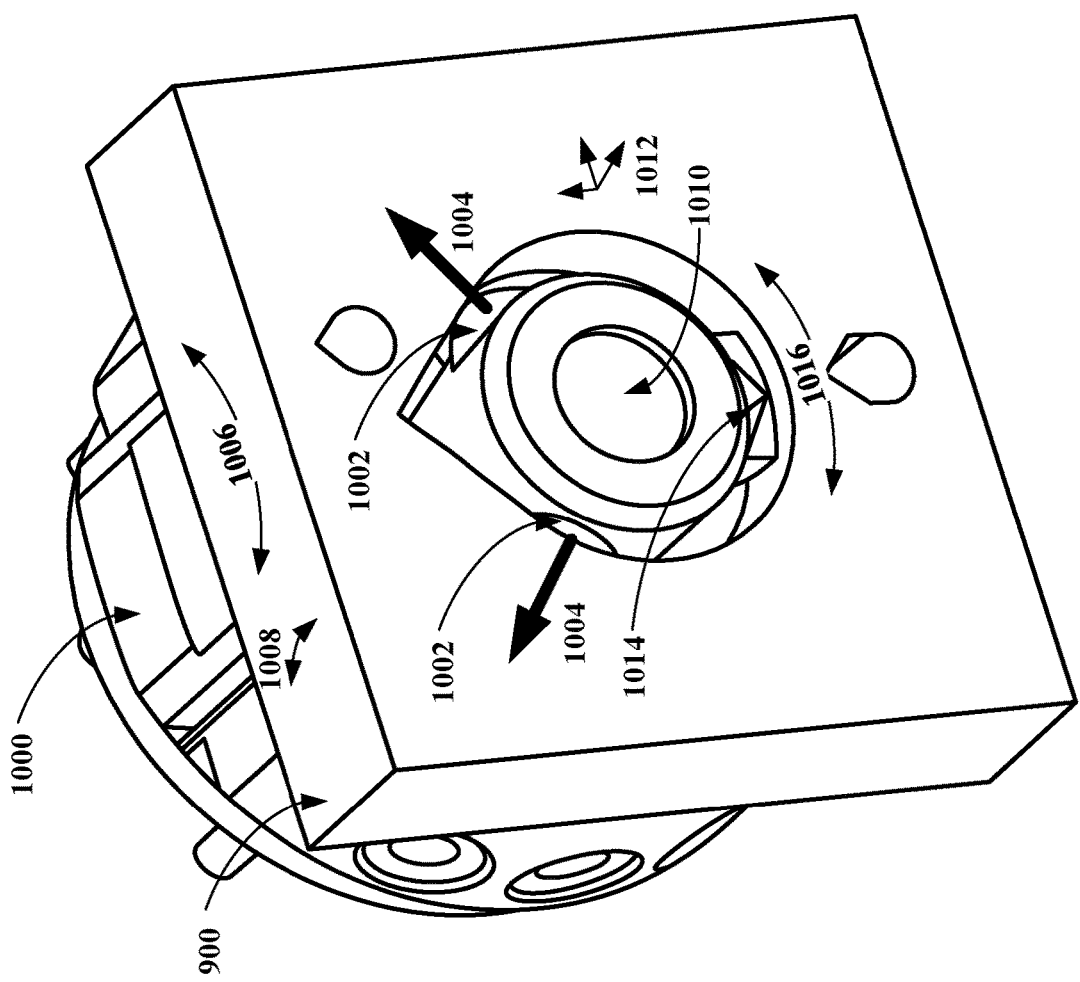
FIG. 10 is a diagram illustrating the end effector feature of FIG. 9 in conjunction with a master.

FIG. 10 is a diagram illustrating the end effector feature 900 of FIG. 9 in conjunction with a master end effector 1000. The master end effector 1000 may be a zero-point end effector. The master end effector 1000 may be a commercially available end effector. By working with a corresponding end effector feature (e.g., end effector feature 900) on an additively manufactured node, the master end effector 1000 may serve as a repeatable and consistent robotic pick-up feature. The end effector feature 900 may be populated on a number of nodes. The zero-point end effector (e.g., the master end effector 1000) may pick up the additively manufactured part using an end effector feature 900 located on an additively manufactured part.

In an aspect, the end effector feature 900 may be shaped like a teardrop. The end effector feature 900 may enable repeatability by constraining all 6 degrees of freedom, e.g., 3 translational axes and 3 rotational axes. The constraint on the 6 degrees of freedom may be realized by locking the 3 translational axes and 3 rotational axes.

Locking the 3 translational axes and 3 rotational axes may be achieved by creating an end effector feature with multiple sub-features. Each of the multiple sub-features may work on constraining the various translational and rotational axes. For example, the master end effector 1000 may include a cylindrical pin with balls 1002. The cylindrical pin with balls 1002 may be displaced outwards radially (1004) while locking. The cylindrical pin with balls 1002 may be used to lock the tilt, thereby locking 2 rotational degrees of freedom (1006, 1008). A second feature on the master end effector 1000 may be a button 1010 (entire master). The button 1010 may constrain the part axially by locking 3 translational degrees of freedom 1012 by landing on the end effector feature 900 on the node. Finally, a slot/V-groove feature 1014 on the end effector feature may lock a last rotational degree of freedom (1016) by locking one ball (1002) of the master end effector 1000. The V-groove feature 1014 may enable self-alignment when one of the balls from the master end effector 1000 gets captured by the groove 1014. Therefore, a 3-point kinematic self-aligning positive control lock is realized between the end effector and the end effector feature.

Additionally, the entire teardrop shaped end effector feature 900 may be co-printed such that the outer edge is chamfered. Chamfering the outer edge of the end effector feature 900 may enable the master end effector 1000 to locate the part in an X-Y plane.

Figure 11:
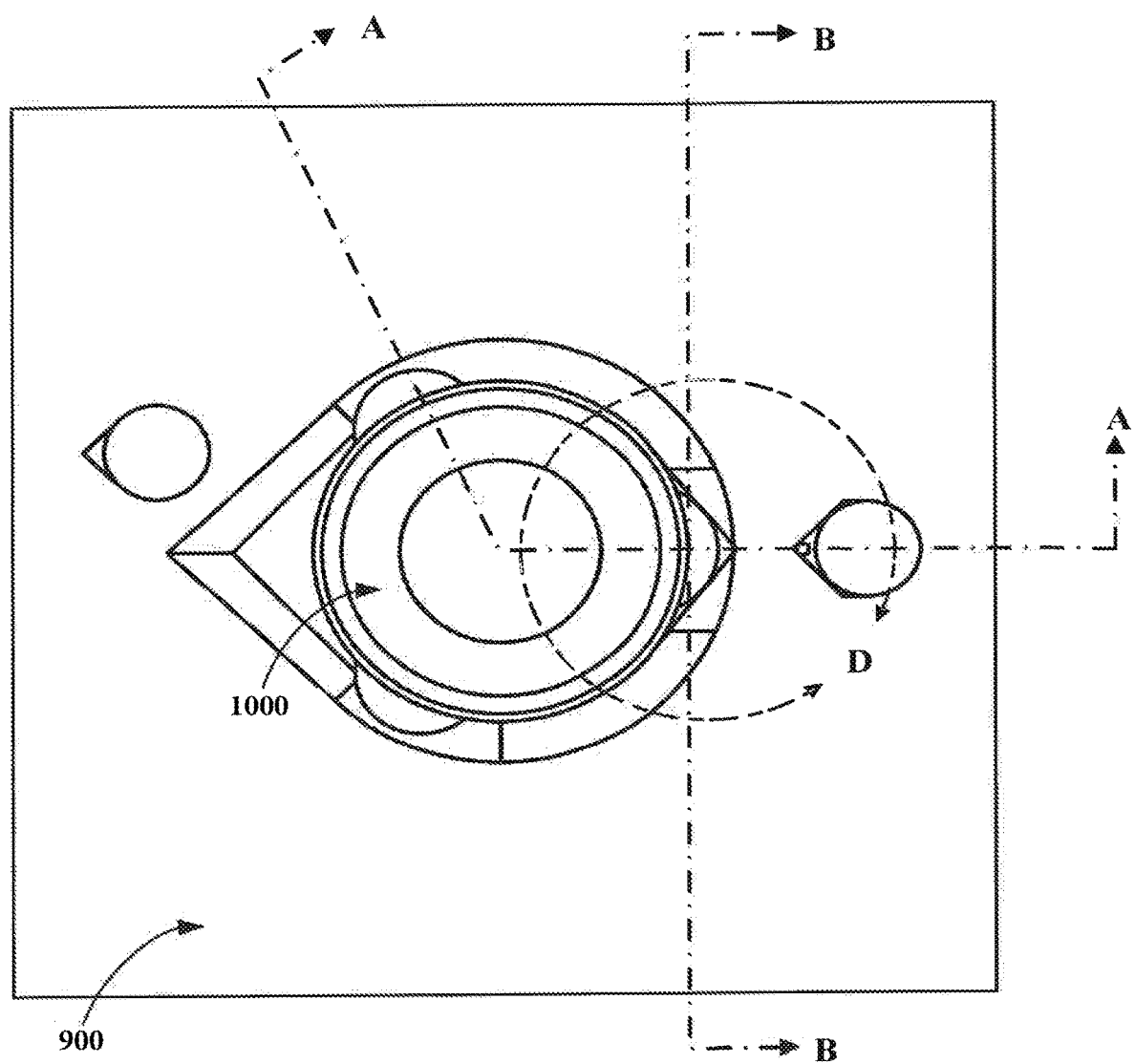
FIG. 11 is a diagram illustrating the end effector feature of FIGS. 9 and 10 and the master end effector of FIG. 10.

FIG. 11 is a diagram illustrating the end effector feature 900 and the master end effector 1000. As discussed above, in an aspect, the end effector feature 900 may be shaped like a teardrop. The end effector feature 900 may enable repeatability by constraining all 6 degrees of freedom, e.g., 3 translational axes and 3 rotational axes. The constraint on the 6 degrees of freedom may be realized by locking the 3 translational axes and 3 rotational axes. The diagram of FIG. 11 illustrates locations for three detail views, A-A, B-B, and D, that are illustrated in other FIG. 12.

Figure 12:
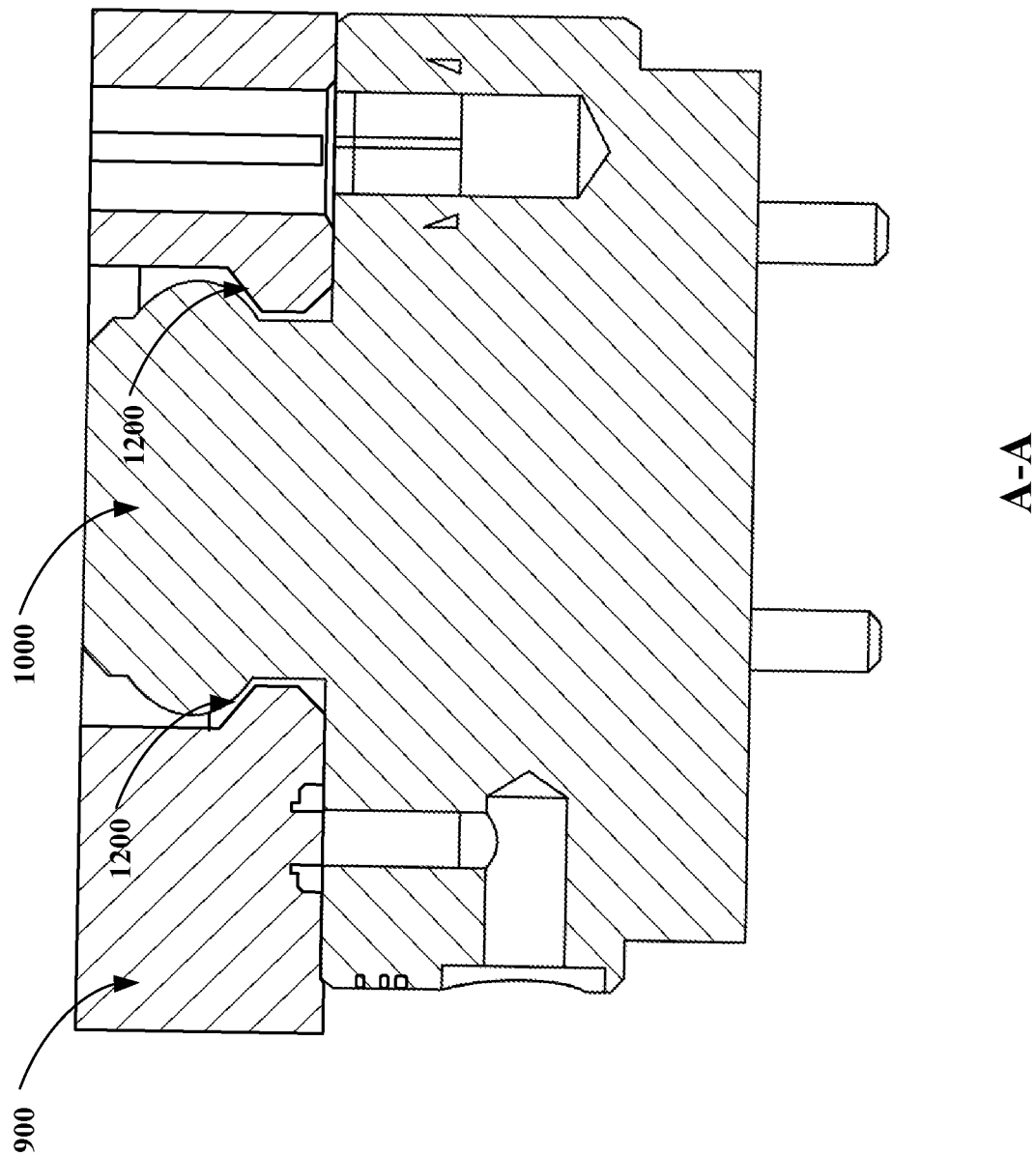
FIG. 12 is a diagram illustrating the detail view (A-A) of the end effector feature of FIGS. 9 and 10 and the master end effector of FIG. 10.

FIG. 12 is a diagram illustrating the detail view (A-A) of an end effector feature 900 and the master end effector 1000. The detail view (A-A) illustrates axial locking 1200. The axial locking 1200 may be provided by the cylindrical pin with balls 1002 of FIG. 10.

Figure 13:
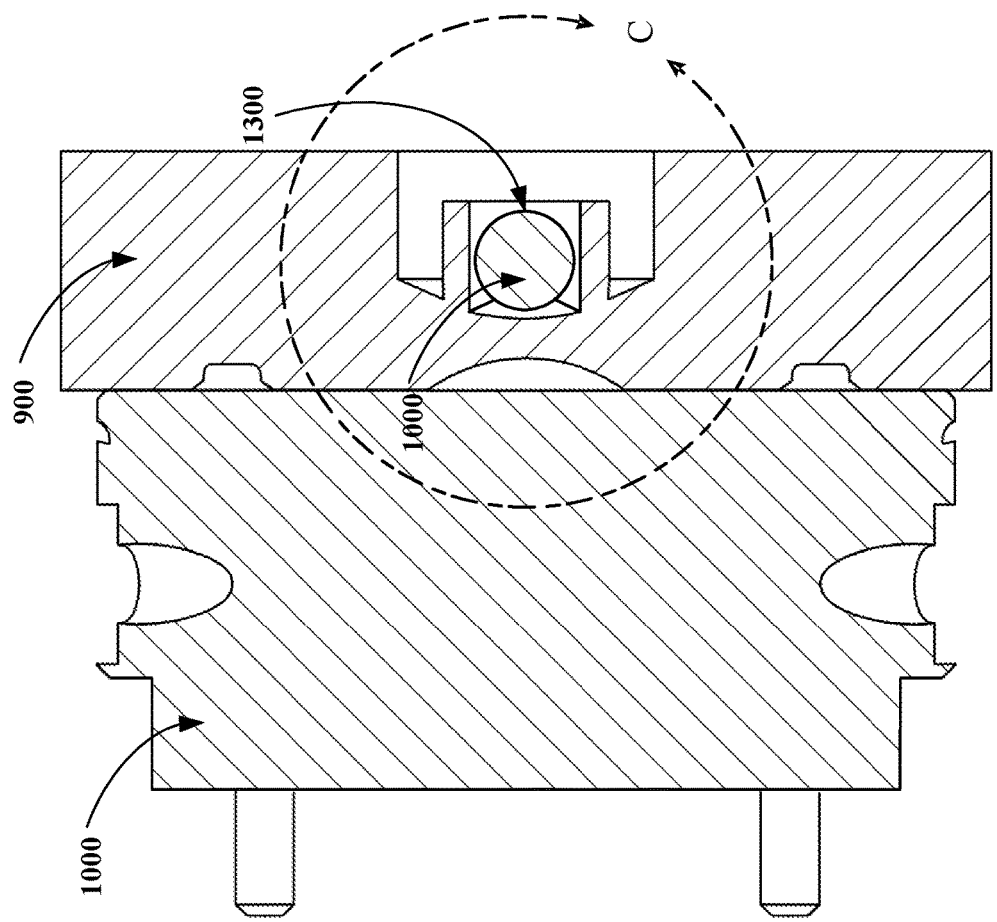
FIG. 13 is a diagram illustrating the detail view (B-B) of the end effector feature of FIGS. 9 and 10 and the master end effector of FIG. 10.

FIG. 13 is a diagram illustrating the detail view (B-B) of an end effector feature 900 and the master end effector 1000. The detail view (B-B) of an end effector feature 900 and the master end effector 1000 illustrates self-alignment using a pin 1300. Self-alignment may be provided by a pin 1300 in the master end effector 1000. The diagram illustrating the detail view (B-B) also illustrates a location of a detail view C, which is discussed with respect to FIG. 14.

Figure 14:
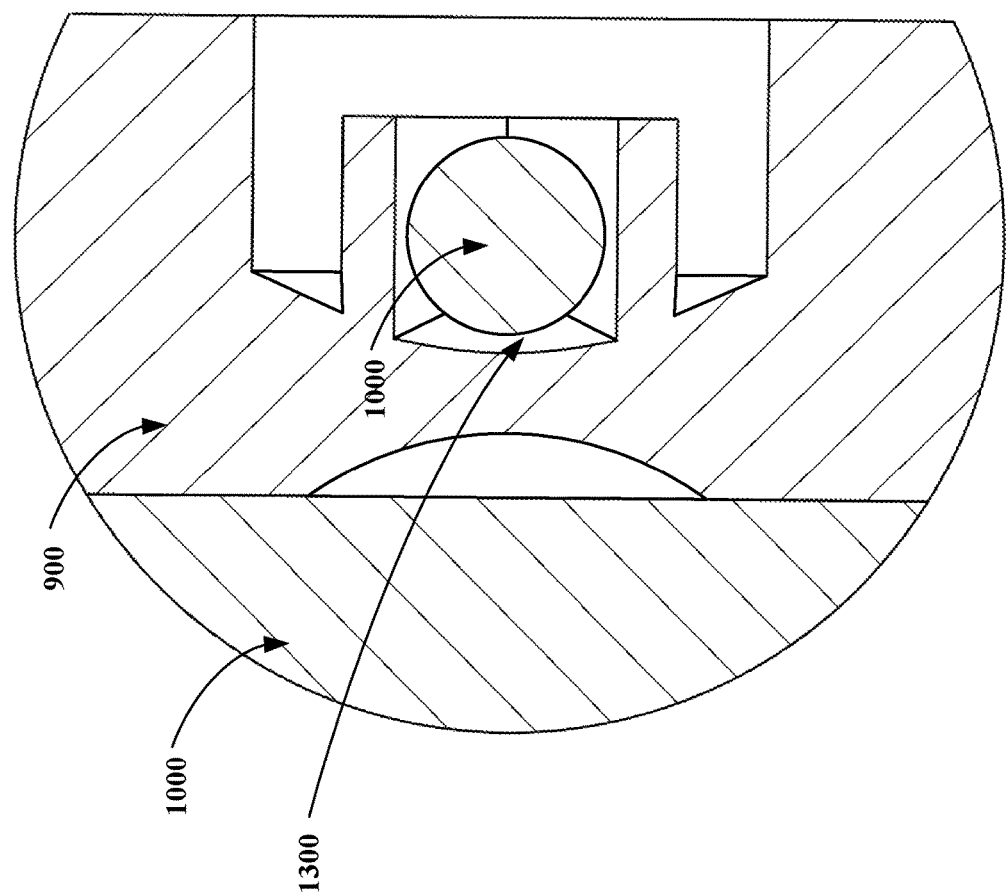
FIG. 14 is a diagram illustrating the detail view (C-C) of the end effector feature of FIGS. 9 and 10 and the master end effector of FIG. 10.

FIG. 14 is a diagram illustrating the detail view (C) of an end effector feature 900 and the master end effector 1000. The detail view (C) of an end effector feature 900 and the master end effector 1000 illustrates self-alignment. Self-alignment may be provided by a pin 1300 in the master end effector 1000.

The master end effector 1000 may include a cylindrical pin 1300 with balls 1002. The cylindrical pin 1300 with balls 1002 may be displaced outwards radially (see 1004, FIG. 10) while locking. The cylindrical pin 1300 with balls 1002 may be used to lock the tilt, thereby locking 2 rotational degrees of freedom (1006, 1008).

Figure 15:
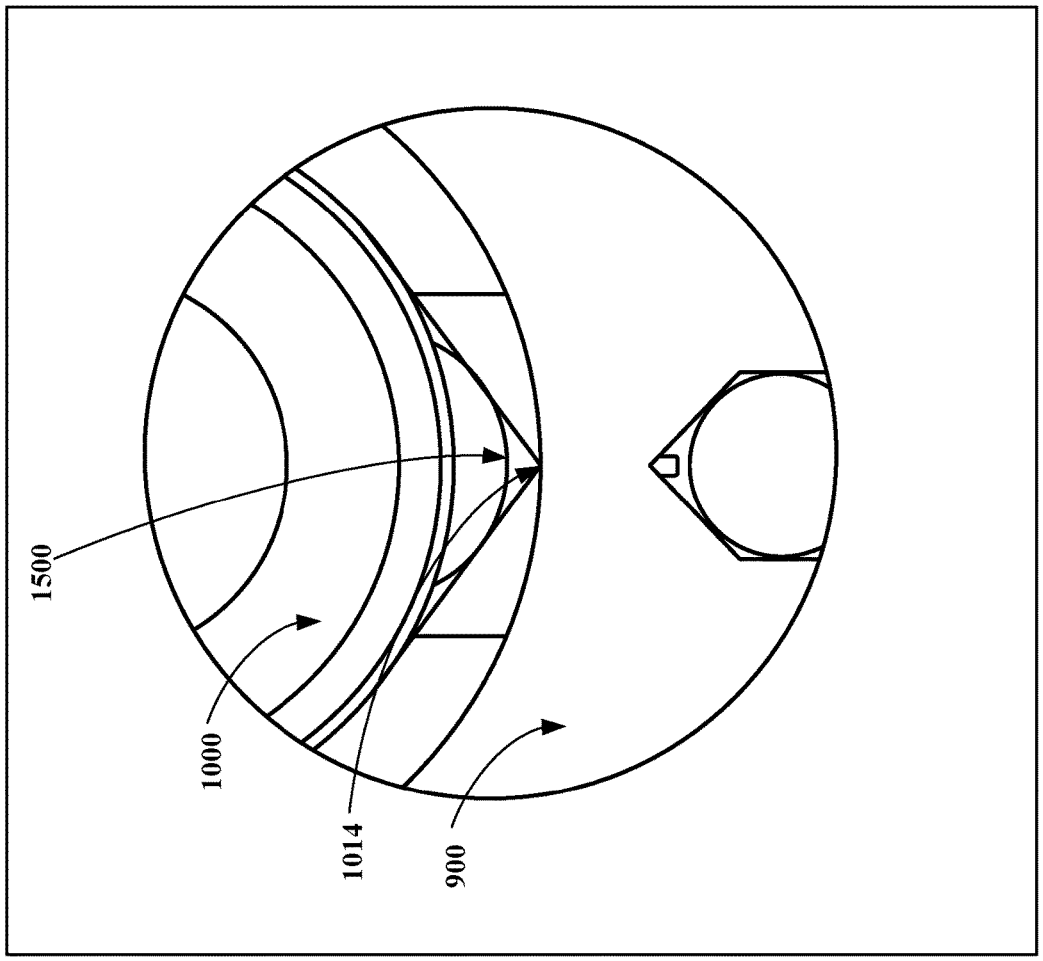
FIG. 15 is a diagram illustrating the detail view (D) of the end effector feature of FIGS. 9 and 10 and the master end effector of FIG. 10.

FIG. 15 is a diagram illustrating the detail view (D) of an end effector feature 900 and the master end effector 1000. The detail view (D) of an end effector feature 900 and the master end effector 1000 illustrates self-alignment rotational locking 1500 provided by the groove 1014. As discussed above, a slot or V-groove feature 1014 on the master effector feature 1000 may lock a rotational degree of freedom by locking one ball of the master end effector 1000. The V-groove feature 1014 may enable self-alignment when one of the balls from the master end effector 1000 gets captured by the groove 1014.

Figure 16:
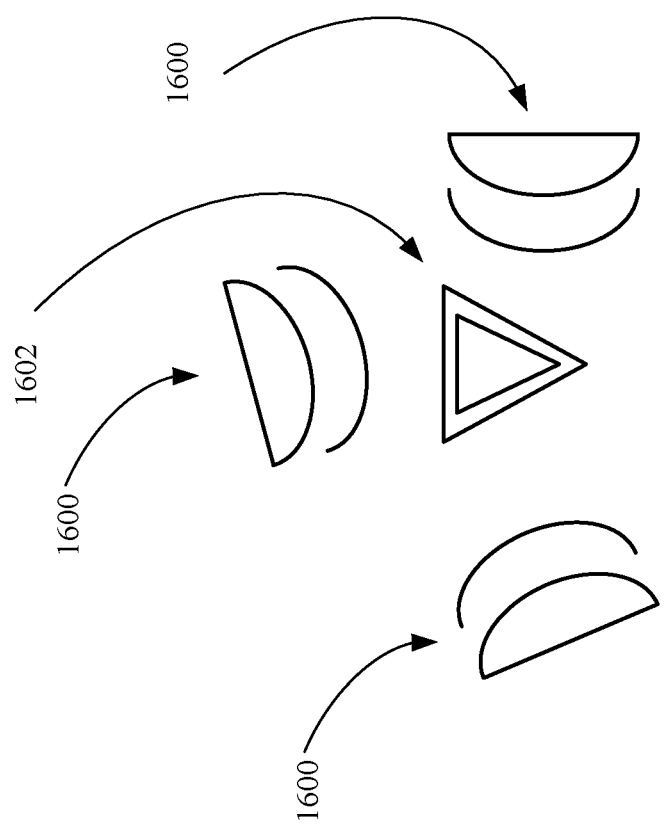
FIG. 16 is a diagram illustrating an example of three end effector features that may be on an additively manufactured component.

FIG. 16 is a diagram illustrating an example of three end effector features 1600 that may be on an additively manufactured component. The aspects illustrated in FIG. 16 may be similar to other aspect presented herein with three end effector features 202 on an additively manufactured component. In addition to the three end effector features 1600, this has an identification feature 1602 in the center which may be visually captured by a robot. The triangle illustrated as the identification feature 1602 in FIG. 16 may be colored and may serve as a reference mark that provides the robot position and orientation information of a part incorporating the three end effector features 1600 and the identification feature 1602. The three end effector features 1600, and the identification feature 1602 may be used as part of the assembly process. The mark used as the identification feature 1602 may, in some aspects, may include one or more of a contrasting color or a texture that may allow for illumination by an external light source to create a well-defined shadow. Another aspect may use a structured light such as a laser line. Structured lines, e.g., laser lines, may be helpful to capture position changes in three dimensions. The ability to better capture position changes in three dimensions may further aid a robot to assemble components accurately.

Figure 17:
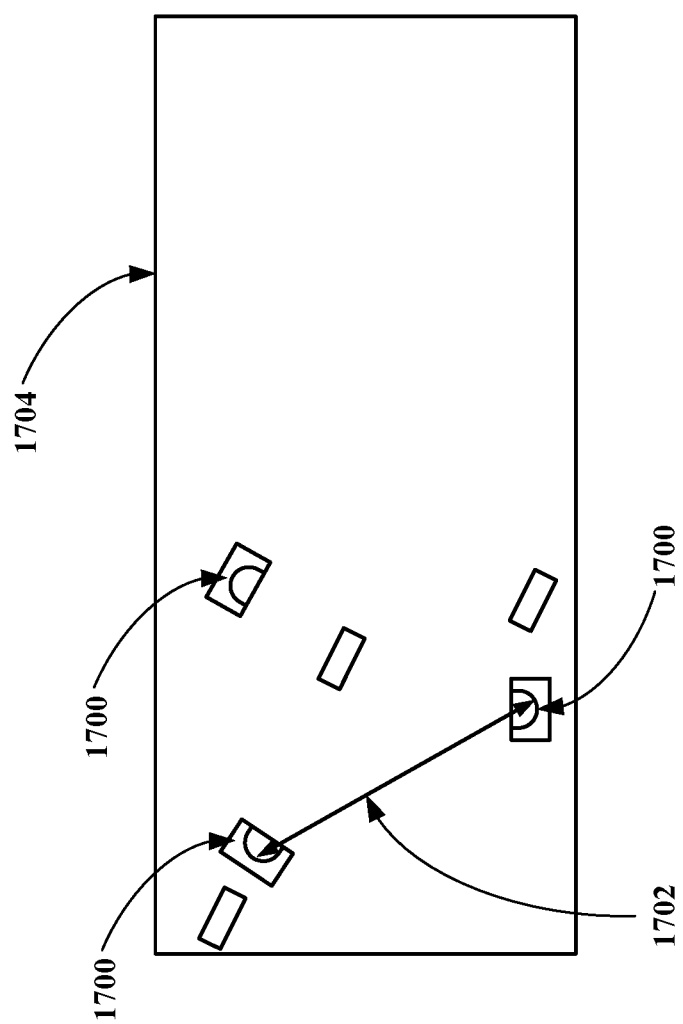
FIG. 17 is a diagram illustrating aspects of end effector features.

FIG. 17 is a diagram illustrating aspects of end effector features 1700. In an aspect, end effector features 1700 may be spaced out (1702) to enable gripping force to counter moments associated with larger mass of certain components 1704. The end effector may open and close against the features 1700 to grip the part (e.g., components 1704).

Figure 18:
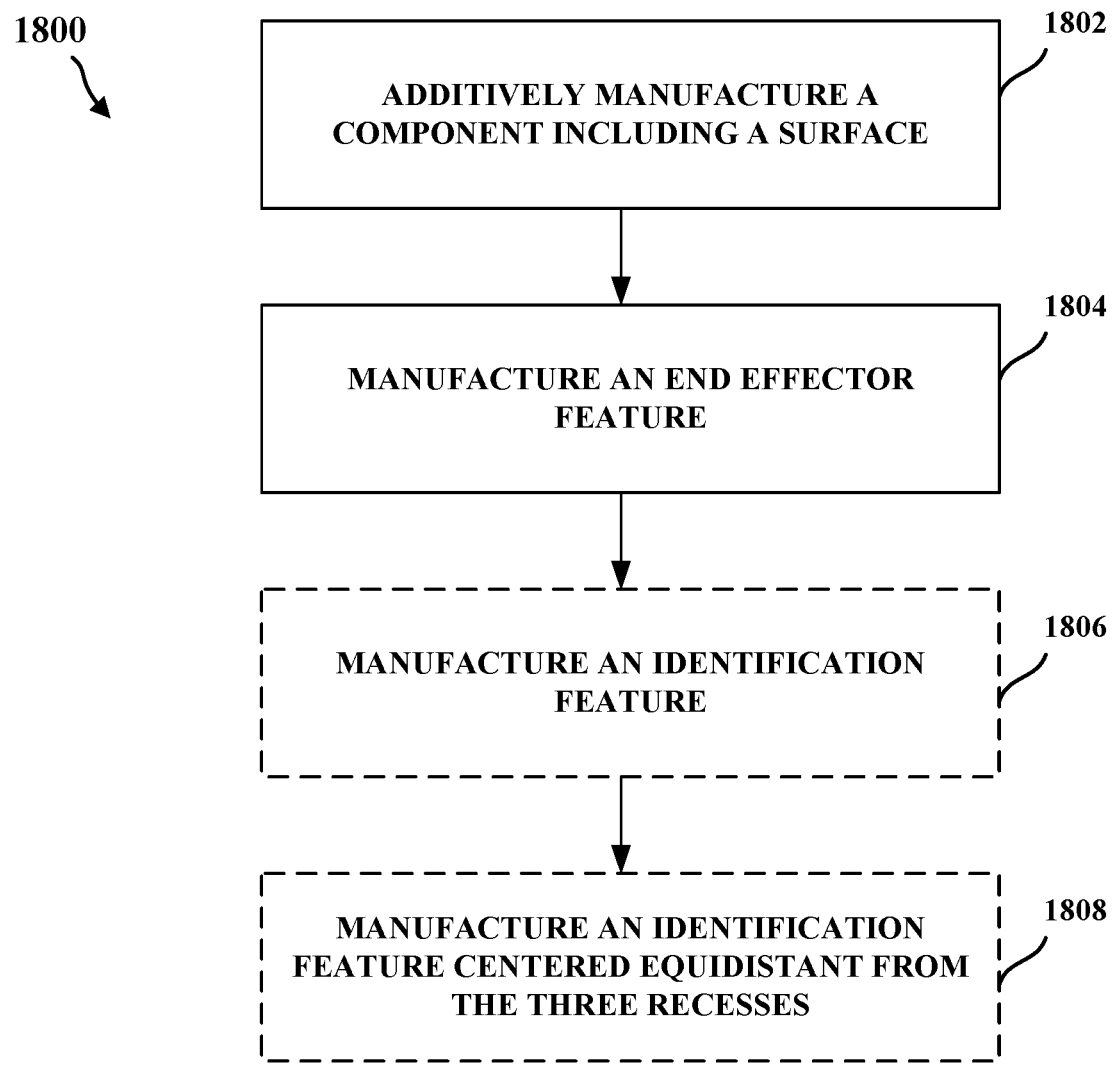
FIG. 18 is a flowchart illustrating an example method in accordance with the systems and methods described herein.

FIG. 18 is a flowchart 1800 illustrating an example method in accordance with the systems and methods described herein. At 1802, a device implementing the method may additively manufacture a component including a surface. For example, the PBF system 100 may additively manufacture a component including a surface. In an aspect, an angle of the angled face may be between 89.9 and 0.1 degrees.

At 1804, the device implementing the method may manufacture an end effector feature. The surface may include the end effector feature, and the end effector feature may be configured to be gripped by a corresponding end effector on a robot. For example, the PBF system 100 may manufacture an end effector feature with the additively manufactured component. In an aspect, the end effector feature may be co-additively manufactured with the manufactured component. In another aspect, the end effector feature may be manufactured separate from the additively manufactured component. In an aspect, the end effector feature may be additively manufactured separate from the additively manufactured component.

In an aspect, the PBF system 100 may co-additively manufacture the end effector feature comprises co-additively manufacturing a recess in the surface. In an aspect, the recess includes an angled face. The recess may have a teardrop shape. In an aspect, the PBF system 100 may co-additively manufacturing the end effector may include co-additively manufacturing a plurality of recesses in the surface. In an aspect, the bottom surfaces of the plurality of recesses are coplanar.

At 1806, the device implementing the method may manufacture an identification feature. For example, the PBF system 100 may additively manufacturing an identification feature. In an aspect, the plurality of recesses may include three recesses. The co-additively manufactured identification feature may be centered equidistant from the three recesses.

At 1808, the device implementing the method may manufacture an identification feature centered equidistant from the three recesses. For example, the PBF system 100 may co-additively manufacture an identification feature centered equidistant from the three recesses.

The previous description is provided to enable any person skilled in the art to practice the various aspects described herein. Various modifications to these exemplary embodiments presented throughout this disclosure will be readily apparent to those skilled in the art, and the concepts disclosed herein may be applied to 3-D printed components and fasteners. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   an additively manufactured component including a surface with an end effector feature, the end effector feature including a face that recedes into a recess in the surface, wherein at least a portion of the face of the end effector feature is angled less than 90 degrees with respect to the surface such that the end effector feature can be gripped by an end effector on a robot such that the additively manufactured component can be lifted by the robot.

2. The apparatus of claim 1, wherein the end effector feature comprises one of an additively manufactured end effector feature manufactured separate from the additively manufactured component, a co-additively manufactured end effector feature co-additively manufactured with the additively manufactured component, or an alternatively manufactured end effector feature manufactured separate from the additively manufactured component.

3. The apparatus of claim 1, wherein the recess has a teardrop shape.

4. The apparatus of claim 1, further comprising an identification feature.

5. The apparatus of claim 1, wherein the end effector feature comprises a plurality of recesses in the surface.

6. The apparatus of claim 5, wherein bottom surfaces of the plurality of recesses are coplanar.

7. The apparatus of claim 5, wherein the plurality of recesses comprises three recesses.

8. The apparatus of claim 7, further comprising an identification feature centered equidistant from the three recesses.

9. The apparatus of claim 1, wherein the end effector feature comprises a teardrop shaped end effector feature.

10. The apparatus of claim 9, wherein the end effector feature enables a 3-point kinematic self-aligning positive control lock.

11. The apparatus of claim 1, wherein the end effector feature is configured to hold the weight of the additively manufactured component.

12. The apparatus of claim 11, wherein the end effector feature is further configured to hold the additively manufactured component during acceleration of the additively manufactured component experienced during assembly.

13. The apparatus of claim 1, wherein an angle between the face and a bottom face of the recess is less than 90 degrees.

14. The apparatus of claim 1, wherein the face of the end effector feature is configured to engage a prong of the end effector to grip and lift the additively manufactured component.

15. The apparatus of claim 1, wherein the end effector feature further comprises a second face, wherein the second face is perpendicular to the surface or a bottom face of the recess.

16. An apparatus, comprising:
   means for additively manufacturing a component including a surface to form an additively manufactured component, and
   means for manufacturing an end effector feature, the end effector feature including a face that recedes into a recess in the surface, wherein at least a portion of the face of the end effector feature is angled less than 90 degrees with respect to the surface such that the end effector feature can be gripped by an end effector on a robot such that the additively manufactured component can be lifted by the robot.

17. The apparatus of claim 16, wherein the means for manufacturing the end effector feature is further configured to one of additively manufactured end effector feature manufactured separate from the additively manufactured component, co-additively manufacture the end effector feature with the additively manufactured component, or an alternatively manufactured end effector feature manufactured separate from the additively manufactured component.

18. The apparatus of claim 16, wherein the recess has a teardrop shape.

19. The apparatus of claim 16, further comprising means for manufacturing an identification feature.

20. The apparatus of claim 16, wherein the means for manufacturing the end effector feature manufactures a plurality of recesses in the surface.

21. The apparatus of claim 20, wherein bottom surfaces of the plurality of recesses are coplanar.

22. The apparatus of claim 20, wherein the plurality of recesses comprises three recesses.

23. The apparatus of claim 22, wherein the means for manufacturing the end effector feature manufactures an identification feature centered equidistant from the three recesses.

24. The apparatus of claim 16, wherein the means for manufacturing the end effector feature is configured to manufacturing a teardrop shaped end effector feature.

25. The apparatus of claim 24, wherein the means for manufacturing the end effector feature manufactures the end effector feature enables a 3-point kinematic self-aligning positive control lock.

26. The apparatus of claim 16, wherein the end effector feature is configured to hold the weight of the additively manufactured component.

27. The apparatus of claim 26, wherein the end effector feature is further configured to hold the additively manufactured component during acceleration of the additively manufactured component experienced during assembly.

28. The apparatus of claim 16, wherein an angle between the face and a bottom face of the recess is less than 90 degrees.

29. The apparatus of claim 16, wherein the face of the end effector feature is configured to engage a prong of the end effector to grip and lift the additively manufactured component.

30. The apparatus of claim 16, wherein the end effector feature further comprises a second face, wherein the second face is perpendicular to the surface or a bottom face of the recess.

\* \* \* \* \*